May 7, 1968   A. J. LEDFORD   3,381,646
CABIN CRUISER DINGHY DAVIT
Filed Sept. 12, 1966   2 Sheets-Sheet 1
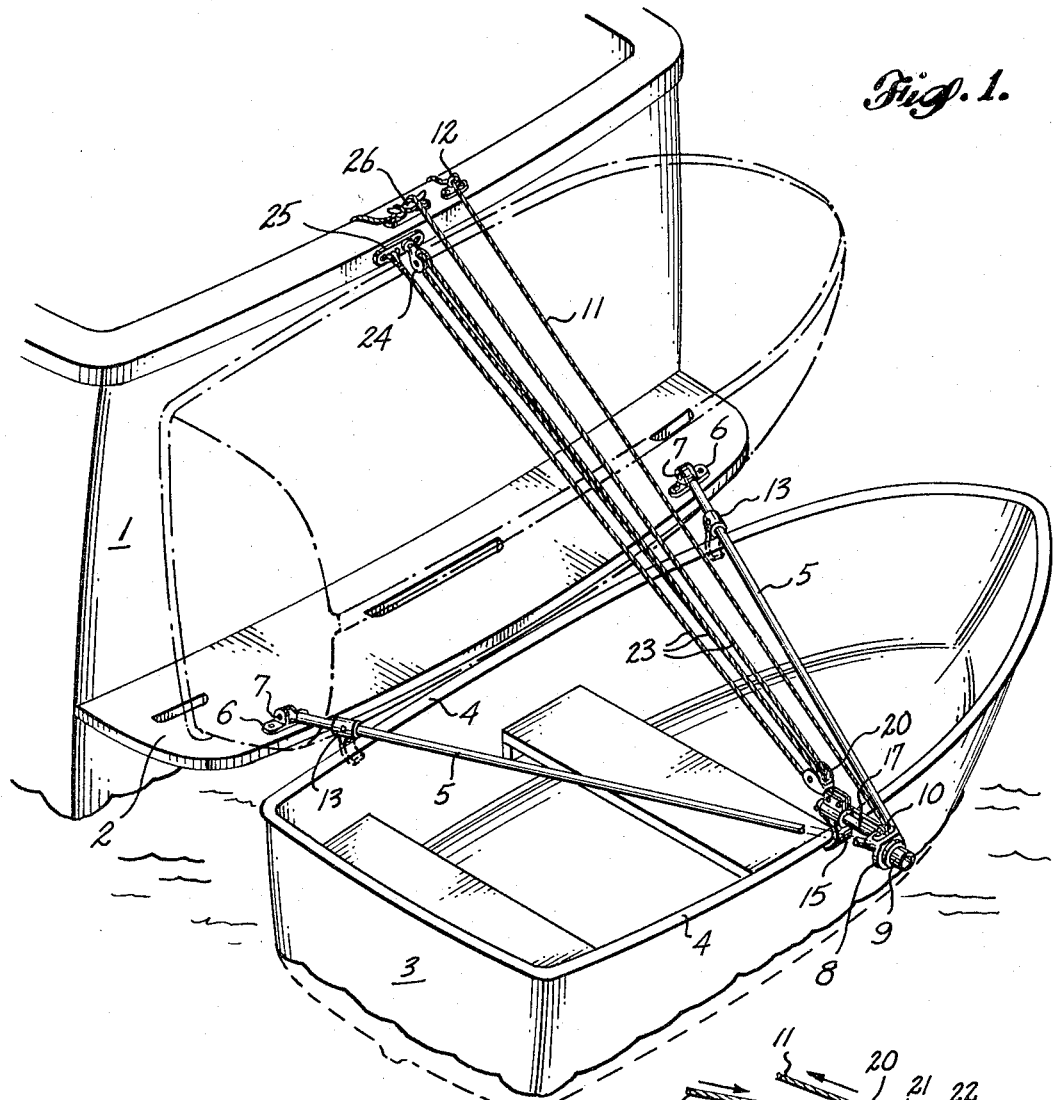
Fig. 1.
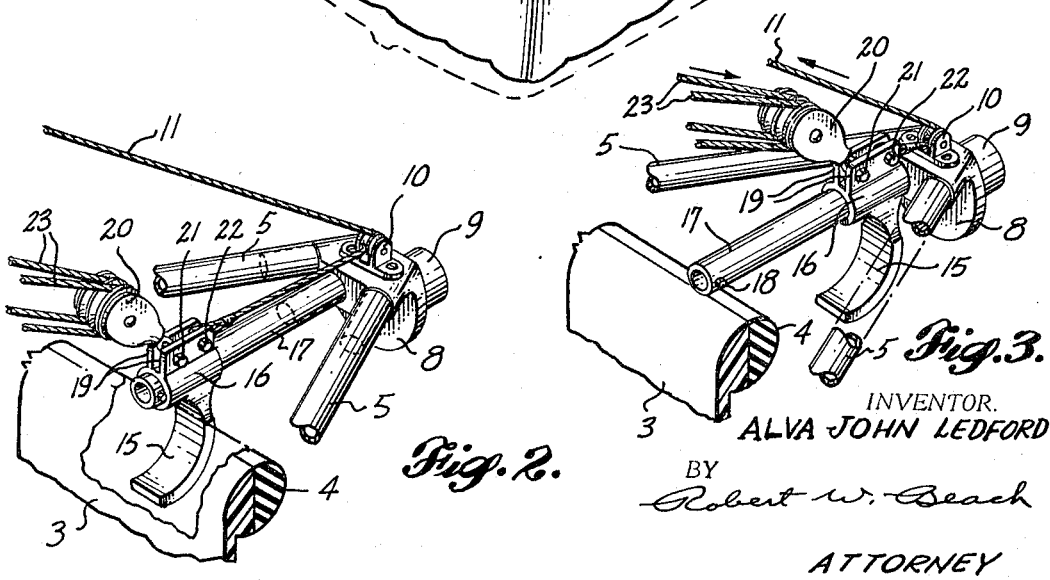
Fig. 2.
Fig. 3.
INVENTOR.
ALVA JOHN LEDFORD
BY
Robert W. Beach
ATTORNEY

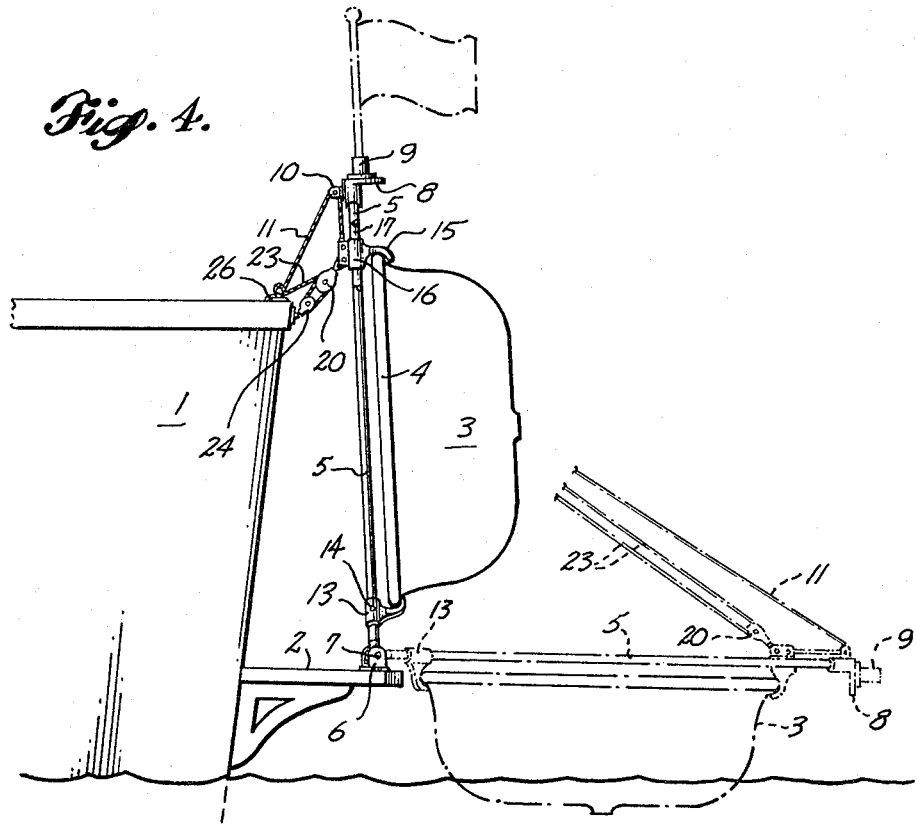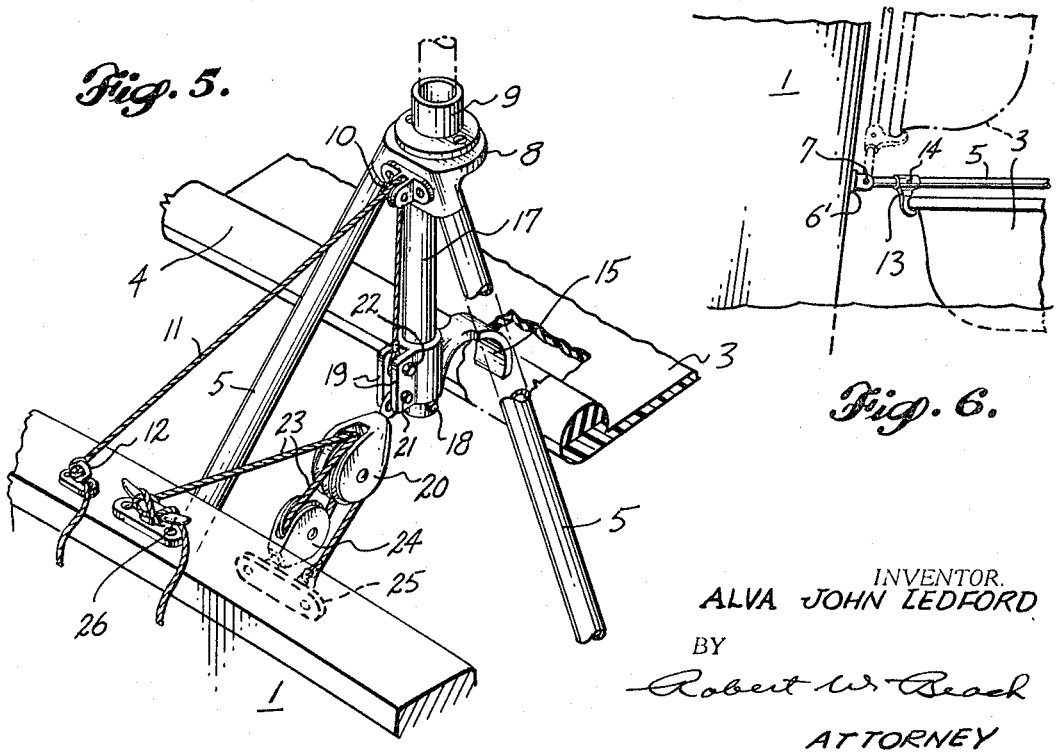

United States Patent Office 3,381,646
Patented May 7, 1968

3,381,646
CABIN CRUISER DINGHY DAVIT
Alva John Ledford, 7724 192nd Place SW.,
Edmonds, Wash. 98020
Filed Sept. 12, 1966, Ser. No. 578,878
12 Claims. (Cl. 114—43.5)

This invention relates to a davit by which a dinghy can be hoisted from the water into a carrying position on a cabin cruiser and can be lowered again for launching. The davit of this invention is particularly useful for thus hoisting a dinghy at the stern of a cabin cruiser positioned with its length extending athwartships of the cruiser which can be hoisted into a carrying position tilted on its side with the length of the dinghy still extending athwartships of the cabin cruiser.

It has been customary to carry a dinghy on the stern of a cabin cruiser in a carrying position alongside the transom of the cabin cruiser. Both when the dinghy is in the water and when it is in its carrying position the length of the dinghy extends athwartships of the cabin cruiser. Ordinarily, a step is provided on a cabin cruiser extending rearwardly from the lower portion of the transom on which the lower gunwale of the dinghy may rest. Frequently it is difficult to place and hold the gunwale of a dinghy securely on such a step and otherwise to secure the dinghy in carrying position, and the solution to this problem has been made much more difficult in instances where the cabin cruiser does not have a transom step.

A principal object of the invention is to provide such a davit of simple and light structure, which at the same time is quite rigid and rugged.

Another object is to provide such a dinghy davit which can be used satisfactorily for dinghies of different size and construction without the necessity of mounting on the dinghy any special attachments or fittings to be connected to the davit. Moreover, it is not necessary for the davit structure to fit the dinghy precisely or to engage any particular location on any dinghy. It is therefore an incidental object to provide such a davit which can be applied to a wide variety of dinghy structures.

In utilizing the davit it is an object to provide a construction which will be easy to apply to the dinghy, which when applied to the dinghy will hold it securely and reliably, and which can be operated easily.

A further object is to provide such a davit which can be manipulated from the stern of a cabin cruiser and can be applied to a dinghy floating in the water astern of the cruiser without the necessity of anyone being in the dinghy or getting into the dinghy, and which, when it is secured to the dinghy, can be manipulated from the stern of the cabin cruiser to hoist the dinghy into carrying position.

Another object is to provide such a davit structure which can be installed on a cabin cruiser quickly and easily with a minimum of alteration in the cabin cruiser and attachments to it.

The foregoing objects can be accomplished by the use of a wishbone frame having one side pivoted to the aft portion of the cabin cruiser for swinging about a horizontal axis from a substantially horizontal position overlying and spanning the width of the dinghy when floating astern of the cabin cruiser into an upright position gripping the dinghy. Such frame includes three gunwale-engaging hooks, two of which are fixed on the frame legs adjacent to the frame pivot for engaging the gunwale of the dinghy closer to the transom of the cabin cruiser, and the third hook is engageable with the gunwale of the dinghy remote from the cruiser. Such third hook can be moved toward the two stationary hooks to clamp the dinghy, and the frame can be swung by manipulation of a hauling pulley tackle attached to the stern of the cabin cruiser and operated by a person in the cabin cruiser stern. Conversely, the davit frame can also be swung from upright position rearward and downward to substantially horizontal position about its pivot for launching the dinghy, and when the dinghy has been launched the gun-wale engaging hooks can be operated by a person standing in the stern of the cabin cruiser to release the dinghy, following which the davit frame can be swung again into upright position without the dinghy and secured.

FIGURE 1 is a top perspective of the stern of a cabin cruiser having the davit of the present invention installed on it and a dinghy in a position to be hoisted by the davit, parts being broken away.

FIGURE 2 is a detail top perspective of the median crown portion of the davit with portions broken away, showing parts in one relationship, and FIGURE 3 is a similar view showing parts in a different relationship.

FIGURE 4 is a side elevation of the stern portion of a cabin cruiser showing the same davit installation as in FIGURE 1 with the dinghy shown cradled in carrying position.

FIGURE 5 is a detail top perspective of the median crown portion of the davit shown in upright position with parts broken away.

FIGURE 6 is a side elevation of the sern portion of a cabin cruiser and an alternative type of davit installation with parts broken away.

The davit of the present invention is most suitable for application to the stern of a cabin cruiser having a flat or substantially flat and substantially upright transom 1. Also, such a davit can be applied more easily to a cruiser having a transom step 2 projecting rearwardly from the lower portion of its transom, as shown in FIGURES 1 and 4. The dinghy 3 to be hoisted and carried by the davit of the invention should have a salient gunwale 4, preferably of astragal type.

The davit includes a wishbone frame having divergent legs 5 the spaced ends of which legs are mounted by brackets 6 on the cabin cruiser stern. As shown in FIGURE 1, such brackets can be secured in spaced relationship on the trailing edge portion of the transom step 2. The leg ends are secured to such brackets by pivots 7. The adjacent ends of the legs 5 are connected by a crown fitting 8 which may carry a socket 9 for receiving the butt of a flagstaff when the wishbone frame is disposed in an upright position as shown in FIGURE 4. On the upper side of the crown is mounted a pulley 10 through which extends a line 11. The end of this line remote from the pulley extends through a ring 12 secured to the stern rail of the cabin cruiser.

Near the spaced ends of the davit legs 5 are mounted hooks 13 engageable with the gunwale of the dinghy nearer the cruiser's stern when the dinghy is floating alongside the cruiser's stern, with the length of the dinghy extending athwartships of the cruiser. Such hooks can be carried by sleeves slidable along the legs 5, and they can be secured to the legs in desired positions by pins 14 extending through the hook sleeves and the frame legs. It may be desirable to secure one of such hooks farther from the adjacent end of its leg than the other hook, depending upon the curvature of the dinghy gunwale to be engaged by the hooks, so that when the near dinghy gunwale is engaged with both of the hooks in the position for hoisting the dinghy the center line of the dinghy will be substantially perpendicular to the center line of the cabin cruiser.

Adjacent to the crown of the wishbone frame is a movable hook 15 carried by a sleeve 16 slidably mounted on a stub guide rod 17 carried by the crown 8 and extending from it generally in the same direction as the frame legs 5 but disposed medially between them. Movement of the sleeve 16 away from the crown 8 is limited by engagement of the sleeve with a stop pin 18 extending through the end portion of the guide rod. From the upper side of the sleeve 16 opposite the depending hook 15 projects two spaced flanges between which is received the anchoring eye of a pulley block 20, which may be a double block. This eye is secured to such flanges by a bolt 21 extending through them and penetrating the eye.

To the same flanges 19 is secured an eye in an end of the line 11 by a bolt 22 which extends through such flanges and penetrates the eye in the line end. As shown in FIGURES 1 and 4, the line 23 extends through the double block 20 and also through a block 24 which is shown in FIGURES 1 and 5 as a single block, but it may also be a double block. This block is secured by a bracket 25 to the stern of the cruiser, to which bracket one end of line 23 may be anchored also. The other end of line 23 can be secured to a cleat 26 mounted on the stern rail of the cruiser as shown in FIGURES 1, 4 and 5.

When a dinghy 3 is to be hoisted by the davit from a position floating astern of the cabin cruiser, as shown in FIGURE 1 and in broken lines in FIGURE 4, into the stowed or carrying position shown in full lines in FIGURE 4, the dinghy is first brought alongside the stern of the cruiser where it may be held generally in the desired position by lines attached to the dinghy separate from the davit structure which are not shown. If at this time the davit frame is secured in the upright position shown in FIGURE 4, the secured end of the line 3 is released from the cleat 26 and the upper portion of the frame is pushed away from the cruiser, if necessary, by an operator standing in the cruiser stern while the line 23 of the tackle is paid out to lower the frame into the position of FIGURE 1. While the davit frame alone is in its upright position and during such lowering movement, it will be seen from FIGURE 1 that, because of the wishbone shape of the frame, it will not obstruct the opposite end portions of the transom step 2 appreciably, so that persons may disembark from the dinghy onto the step at either side of the frame, and, in fact, use such frame for handhold rail if the frame is securely anchored in its upright position.

It will be evident from FIGURE 1 that the dinghy 3 should be spaced from the cruiser stern sufficiently far so that both hooks 13 can be lowered into the space between the step and the adjacent gunwale of the dinghy. The height of the frame should be sufficiently great so that when it has been laid onto the dinghy a substantial portion of the stub guide rod 17 will project beyond the remote gunwale. By pulling in the hook hand-out line 11 the sleeve 16 will be slid along the rod 17 into the position shown in FIGURE 3, in which the hook 15 is outside the dinghy. The weight of the frame should be sufficiently great so that it will ride on the gunwale of the dinghy while overlying the dinghy, even though the dinghy may be rolling and pitching relative to the cruiser stern. The weight of the frame will tend to damp such movement of the dinghy.

If line 11 is now released so that it can slide through the eye 12 on the cruiser and the tackle line 23 is hauled in, the block 20 will pull the slide 16 from the position of FIGURE 3 to the position of FIGURE 2 in which the hook 15 has engaged the dinghy gunwale. As the line 23 is tightened farther, movement of hook 15 will press the dinghy toward hooks 13 until its gunwales are clamped securely between the hook 15 on one side and the hooks 13 on the opposite side. Because only three hooks engage the dinghy gunwale the dinghy can yaw as may be necessary so that both hooks 13 engage the dinghy gunwale securely, and the dinghy will then be held against further yawing, pitching and rolling.

If the tackle line 23 is now hauled in farther, the clamping action of the hooks 13 and 15 on the dinghy will increase because of the load placed by the tackle on the bolt 21 and sleeve 16 even though such sleeve is prevented from moving farther toward hooks 13 because of engagement with the dinghy. Because the force exerted on the bolt 21 by the tackle is along an inclined line, as shown best in broken lines in FIGURE 4, the frame will be swung from the substantially horizontal position of FIGURE 1, also shown in broken lines in FIGURE 4, upward toward the upright position shown in solid lines in FIGURE 4, carrying the dinghy with it. During this operation the line 11 also should be drawn forward through the eye 12 to prevent this line from becoming tangled, but it should be kept slack so as to avoid hauling hook 15 away from its engagement with the dinghy gunwale.

As the dinghy reaches the stowed position shown in solid lines in FIGURE 4, in which it is cradled in the hooks 13 and preferably has swung into a position such that the gunwale is inclined somewhat forwardly and upwardly, the tackle line 23 can be secured to the cleat 26 to hold the davit and dinghy securely in this position. The extent to which the dinghy is raised above the water during such manipulation will be governed by the position of hooks 13 along the frame legs 5 and the overall height of the frame. It will be evident that if such hooks are spaced farther from the pivots 7 the dinghy will be raised bodily to a greater extent during such hoisting operation.

To launch the dinghy again line 11 will be released if it has been secured, and then line 23 will be released from cleat 26 and will be paid out so that the davit and dinghy can swing downward from the slod-line position of FIGURE 4 to the broken-line position. When it is desired to release the dinghy, line 23 will be slackened completely, and the inboard end of line 11 will be pulled as indicated by the arrow in FIGURE 3 to haul the sleeve 16 and hook 15 from the dinghy-engaging position shown in FIGURE 2 back to the released position of FIGURE 3. In fact, by applying a continued pulling force on such line the davit frame can be swung upward about the pivots 7 so that the hooks 13 will kick the dinghy away from the cruiser stern sufficiently to enable them to pass the dinghy so that the frame may be swung empty into the upright position shown in solid lines in FIGURE 4. The frame can then be secured in this position either by securing the line 11 or by hauling in the tackle line 23 and securing it to the cleat 26. It is not necessary that the trackle line be hauled in in order to stow the davit frame in its upright position when it is empty.

If the cruiser stern 1 does not have a transom shelf 2, the spaced ends of the wishbone frame legs 5 can be mounted directly on the cruiser transom by brackets 6′ as shown in FIGURE 6. The structure of the davit and the manner in which it is operated will otherwise be the same as described above.

While the davit frame could be made of different types of structural members, it is preferred that the legs 5 and the stub guide rods 17 be tubular and that the hooks 13 and 15 and the crown 8 be of appropriate cast metal.

I claim as my invention:

1. A cabin cruiser dinghy davit comprising a frame, means attachable to a cabin cruiser stern and guiding said frame for swinging between a lowered substantially horizontal position overlying a dinghy while floating and an upright position raised alongside the transom of the cabin cruiser, gripping members carried by said frame engageable with opposite side portions of a dinghy and movable relatively toward and away from dinghy-gripping relationship, one of said gripping members being movably carried on said frame and means extending from the stern portion of the cabin cruiser and connected to said movable gripping member for effecting relative movement of said dinghy-gripping members to grip a dinghy therebetween and for swinging said frame from said lowered position to said raised position to lift and tilt the dinghy.

2. The davit defined in claim 1, in which the last means are operable to swing the frame from its substantially horizontal position upward into a dinghy-carrying position.

3. The davit defined in claim 1, in which the last means includes block and tackle means.

4. The davit defined in claim 1, and dinghy-releasing means extending between the cabin cruiser stern and the frame for effecting relative movement of the gripping members to release a dinghy gripped therebetween.

5. The davit defined in claim 4, in which the dinghy-releasing means includes a haulout line connected to one of the gripping members which is movable.

6. The davit defined in claim 5, including only three gripping members, two of which are disposed for engagement with one side portion of a dinghy and the third gripping member being engageable with the opposite side portion of the dinghy.

7. The davit defined in claim 6, in which the two gripping members engageable with one side portion of the dinghy are fixed relative to the frame, and means guiding the third gripping member for movement toward and away from said fixed gripping members.

8. The davit defined in claim 7, in which the means for effecting relative movement of the gripping members is connected to the third gripping member and is operable to move the third gripping member both toward and away from the two fixed gripping members.

9. The davit defined in claim 8, in which the gripping members are engageable with the exterior of the dinghy side portions and the means for effecting relative movement of the gripping members includes line means connected between the movable gripping member and the cabin cruiser stern.

10. The davit defined in claim 9, in which the dinghy has salient gunwales and the gripping members are hooks shaped generally complemental to such gunwales for gripping them.

11. The davit defined in claim 7, in which the two fixed gripping members are located adjacent to the cruiser stern and are engageable with the side of the dinghy adjacent to the cruiser stern, and the third gripping member is located remote from the cruiser stern and is engageable with the other side of the dinghy.

12. The davit defined in claim 11, in which the frame is a wishbone frame including two legs diverging from an apex portion of the frame, the two fixed gripping members are carried respectively by the spaced end portions of said legs, pivot means mounting the spaced end portions of said legs on a cabin cruiser stern, and the guide means for the movable gripping member are carried by the apex portion of said frame.

References Cited

UNITED STATES PATENTS

| | | | |
|---|---|---|---|
| 2,294,864 | 9/1942 | Palmer | 9—30 |
| 2,473,557 | 6/1949 | Woodruff | 9—39 |
| 2,703,893 | 3/1955 | Woodruff | 9—39 X |
| 3,143,991 | 8/1964 | Anderson | 114—43.5 |

MILTON BUCHLER, *Primary Examiner.*

T. MAJOR, *Assistant Examiner.*